United States Patent [19]

Anderson et al.

[11] Patent Number: 4,596,442
[45] Date of Patent: Jun. 24, 1986

[54] FIBEROPTIC FLOW INDICATOR SYSTEM

[75] Inventors: John C. Anderson, Houston; Ralf Eberlein, Missouri City; Morris J. Davies, Stafford, all of Tex.

[73] Assignee: Fiberdynamic, Inc., Houston, Tex.

[21] Appl. No.: 563,128

[22] Filed: Dec. 19, 1983

[51] Int. Cl.[4] .................... G01F 15/00; G02B 6/36
[52] U.S. Cl. .................... 350/96.20; 73/188; 116/275; 350/96.10
[58] Field of Search ............ 350/96.10, 96.20, 96.15; 73/188, 189; 116/273, 275

[56] References Cited

U.S. PATENT DOCUMENTS 3,223,846 12/1965 Rochester .................... 73/188 X

FOREIGN PATENT DOCUMENTS 55-95903 7/1980 Japan .................... 350/96.20

Primary Examiner—John Lee
Attorney, Agent, or Firm—Dula, Shields, Egbert

[57] ABSTRACT

A flow indicator switch system comprising a body having a cavity therein, a first magnetic member pivotally connected to the body and extending into the cavity, a second magnetic member pivotally connected to the body, and a fiberoptic connector arranged about the body for receiving at least one optical fiber. The first magnetic member has a portion that extends beyond the body. A magnet is affixed to the first magnetic member on the end within the body and a paddle is affixed to the other end extending beyond the body. A spring is arranged about the exterior of the first magnetic member. The second member is magnetically interactive with the first magnetic member within the cavity of the body. The second magnetic member has a reflective surface extending therefrom. This reflective surface is generally adjacent the fiberoptic connector and is movable between a first and second position in correspondence to the existence of a fluid flow acting on the paddle.

18 Claims, 3 Drawing Figures

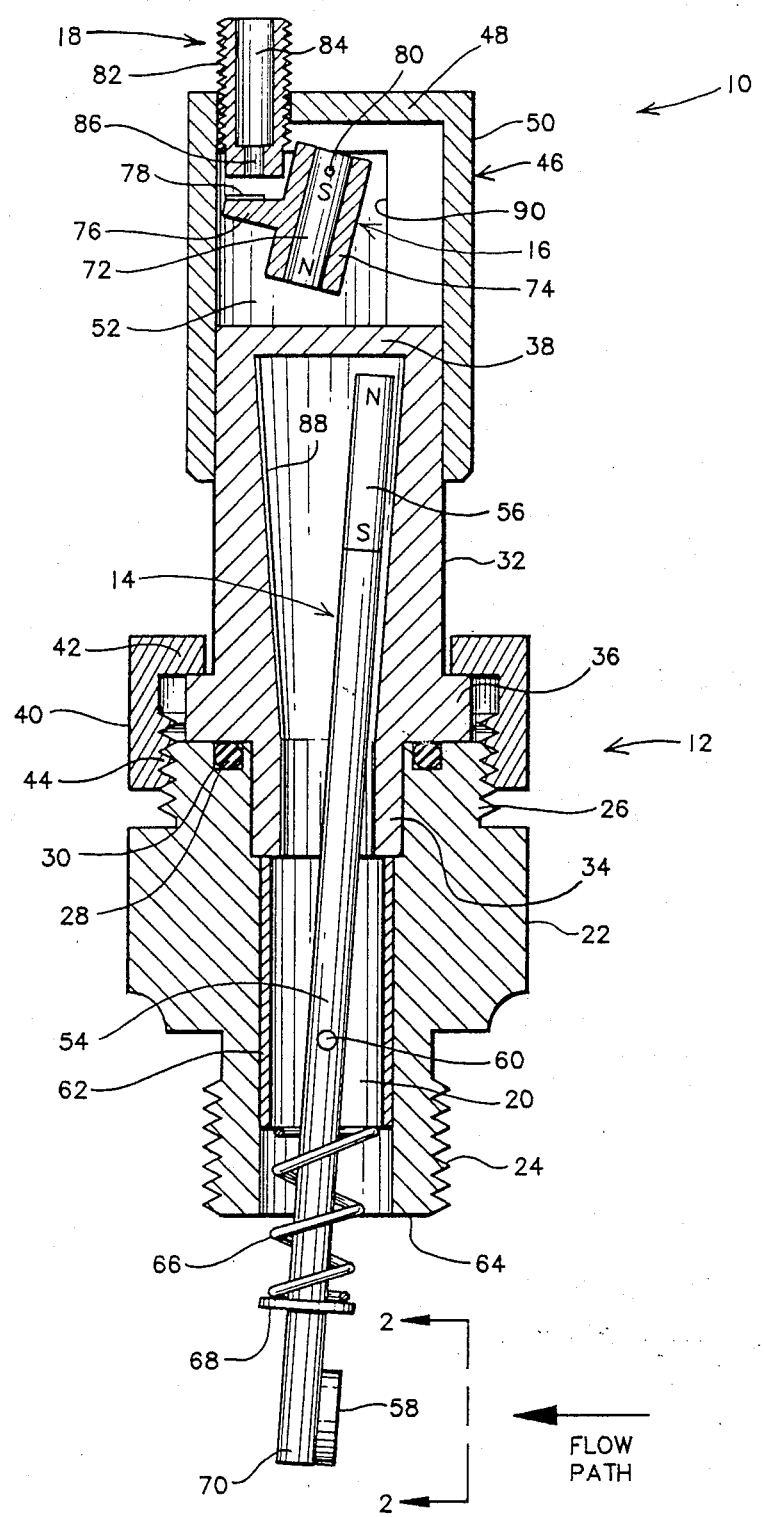
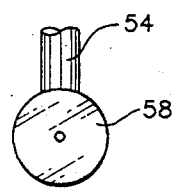
FIG. 1
FIG. 2

1

FIBEROPTIC FLOW INDICATOR SYSTEM

FIELD OF THE INVENTION

The present invention relates to indicator systems for the identification of fluid flow. More particularly, the present invention relates to fluid flow indicator systems incorporating fiberoptics for the generation and transmission of signal information.

BACKGROUND ART

Fiberoptics is the branch of physics concerned with the propagation of light that enters a thread or rod of transparent material at one end and is totally reflected back inward from the wall, thereby being transmitted within the fiber from one end to the other. Fiberoptics is widely applied in medical practice to observe the human body internally. Fiberoptic fibers have also been used to transmit light signals carrying information from both electronic and optical sensors.

In the chemical industry, fluid flow indicators are essentially in control in all phases of processing and in determining the material balance for processing units. Once manufactured, the transmission of materials through pipeline between distant places calls for constant monitoring of flow.

A multiplicity of techniques have been used in the monitoring and measurement of fluid flow. Monitoring the impact pressure upon a probe inserted into the process stream will yield an indication of fluid flow. A turbine rotor is often used to rotate freely in a moving fluid, its rotation causes a sudden distortion in the field of a small, powerful magnet located in a sensor unit outside the pipe. This distortion generates a voltage that is transmitted to a small computer. The computer can both measure the flow rate and monitor the distance of flow within the pipeline.

While many systems have been available for the monitoring of fluid flow, it is not believed that these systems have usefully incorporated fiberoptics for the transmission of such information. Furthermore, any systems that have incorporated fiberoptics for such monitoring have failed to utilize single optical pathways for this information.

It is an object of the present invention to provide a fluid flow indicator system that is inherently safe in even the most hazardous of environments.

It is another object of the present invention to provide a fluid flow indicator system that imparts no electrical disturbances on or about the fluid flow.

It is still another object of the present invention to provide a system for monitoring fluid flow that is simple to construct and adaptable to a wide variety of varying environments.

These and other objects and advantages of the present invention will become apparent from a reading of the attached specification and appended claims.

DISCLOSURE OF THE INVENTION

The present invention is a flow switch associated with fiberoptics that comprises: a body having at least one cavity occurring therein, a first magnetic member pivotally connected to the body and extending into the cavity, a second magnetic member pivotally connected to the body and magnetically interactive with the first magnetic member, and a fiberoptic connector arranged about the body for receiving at least one optical fiber.

The first magnetic member has a portion that extends beyond the body. A magnet is affixed to the end of the member within the cavity and a paddle is attached to the other end of this member. The paddle is adapted so as to be interactive with the flow of a fluid. In particular, this paddle is to be inserted into a pipeline for the purposes of monitoring fluid flow. A spring is arranged about the first magnetic member for maintaining this magnetic member in a position relative to the existence of a flow acting on the paddle. The spring causes this magnetic member to return to an original position in the absence of a fluid flow. In operation, the magnetic member is movable between a first and a second position corresponding to the existence or absence of a flow of a fluid acting on the paddle. To facilitate the introduction of the flow switch into the pipeline, a connector is provided about the end of the body adjacent the paddle.

The second magnetic member is pivotally mounted within a second cavity in the body. This second magnetic member includes a magnet that is arranged relative to the first magnetic member such that the adjacent poles of the first and second magnetic members exert opposing magnetic forces upon each other. In other words, these magnets repel each other. This second magnetic member is movable between a first position and a second position within the second cavity. These first and second positions are in correspondence to the existence of a fluid flow acting on the paddle on the first magnetic member. The second magnetic member comprises a magnetic portion, a casing surrounding the magnetic portion, and a reflective surface extending from the casing so as to be generally adjacent the fiberoptic connector.

The fiberoptic connector is a receptacle extending through the body into the cavity. This receptacle is positioned so as to be generally adjacent the reflective surface of the second magnetic member. The reflective surface moves between a first and second position relative to the optical fiber received by the fiberoptic connector. The first position is generally adjacent the receptacle of the optical fiber for reflecting light from the optical fiber toward the optical fiber. The second position causes the light from the optical fiber to reflect away from the optical fiber.

The present invention further includes suitable electronics that provide an output information relative to the existence of fluid flow. A single optical fiber is received by the receptacle of the fiberoptic switch. This optical fiber transmits light from a light source to the cavity in which the second magnetic member is contained. A detector is included that receives light as reflected by the second magnetic member. This detector is of the type that is responsive to light from the optical fiber. Suitable output electronics are electrically connected to the detector for producing a signal relative to the light as received by the detector. The light source is a light-emitting diode. A beamsplitter is interposed between the optical fiber, the light-emitting diode, and the detector. The beamsplitter passes light from the light source to the optical fiber and passes the light from the optical fiber to the detector. The detector is a photodetector positioned relative to the optical fiber so as to be electrically responsive to light emitted by the optical fiber. The detector further includes an amplifier electrically connected to the photodetector, a rectifier electrically connected to the amplifier, and a filter electrically connected to the rectifier. The detector further includes a trigger circuit that is electrically connected to the photodetector for producing an output of fixed amplitude. The output of this fluid flow indicator system is a light-emitting diode having on/off capability responsive to the position of the reflective surface of the second magnetic member within the flow switch. This light-emitting diode produces a humanly perceivable signal as to the existence of fluid flow within the pipeline being monitored.

BRIEF DESCRIPTION OF THE DRAWINGS

FIG. 1 is a side elevational view in cross section of the flow switch in accordance with the preferred embodiment of the present invention.

FIG. 2 is a view of the paddle of the flow switch taken across lines 2—2 of FIG. 1.

BEST MODE FOR CARRYING OUT THE INVENTION

Figure 3:
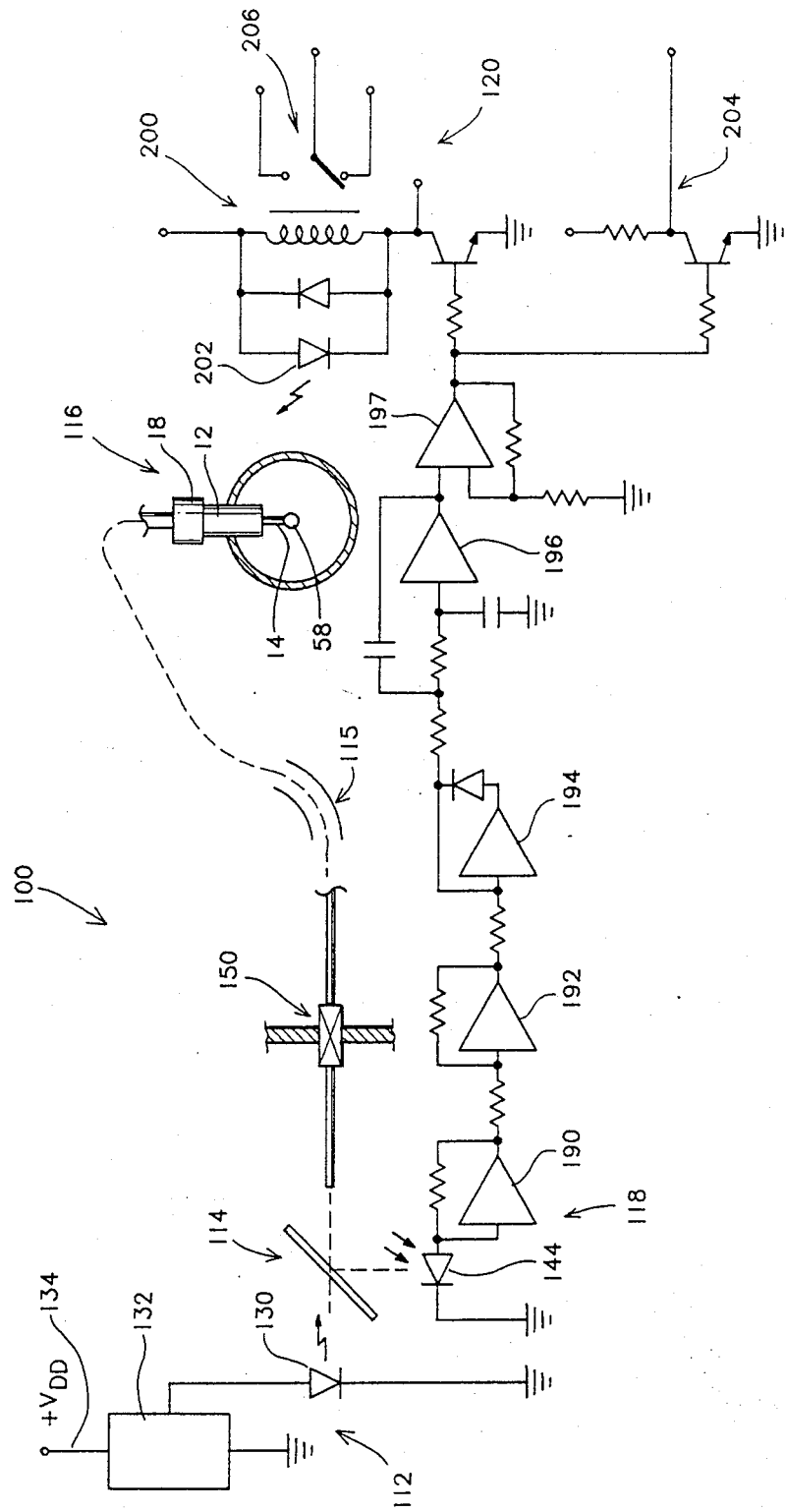
FIG. 3 is a schematical representation of the detection system associated with the flow switch in accordance with the present invention.

Referring to FIG. 1, there is shown at 10 the flow switch for the monitoring of fluid flow in accordance with the present invention. As seen in FIG. 1, flow switch 10 includes body 12, first magnetic member 14, second magnetic member 16, and fiberoptic connector 18. Body 12 has a cavity 20 extending therethrough.

Body 12 is assembled for several components. Lower body member 22 is a section of machined aluminum, or other metal. At its lowermost portion, lower body member 22 has a threaded section 24. Threaded section 24 is designed to be received by the well of a pipeline that is to be monitored. In many pipelines, the threaded arrangement of the well is a standard configuration. Thus, threads 24 should be of the type to be appropriately received by such a well. The upper portion 26 of lower body member 22 is also a threaded male connector. As described hereinafter, this threaded section 26 allows flow switch 10 to be adjusted as needed such that first magnetic member 14 can monitor the fluid flow. An O-ring 28 is received by grooves 30 in lower body member 22. This O-ring 28 acts as a sealant between lower body member 22 and upper body portion 32. Upper body portion 32 has a cavity that generally corresponds to the cavity within the lower body portion 22. Together, these cavities align and form internal cavity 20. The lower part 34 of upper body portion 32 is received by the interior of lower body member 22. A shoulder 36 extends outwardly from this lower part 34. Shoulder 36 fits flush against the top of lower body member 22 and presses against O-ring 28. For the remainder of its length, upper body portion 32 is generally cylindrical. However, upper body portion 32 has a closed top end 38. Top 38 may be manufactured from the same material as upper body portion 32, or it may be affixed to the top of this upper body portion. The only significant requirement is that this top 38 be made of a non-magnetic material.

A connector 40 is utilized to join lower body member 22 and upper body portion 32 together. Connector 40 is generally cylindrical, except for shoulder 42. Connector 40 has female threads 44 that are of the type to match with threaded section 26 of lower body member 22. By tightening connector 40 about threaded section 26, upper body portion 32 is joined to lower body member 22 in a sealed connection.

At the top of body member 12 is a slotted, closed-cylinder member 46. Member 46 is press-fitted, welded, epoxy-sealed, or connected in any other way to the top 38 of upper body portion 32. Member 46 includes a slot that allows the free movement of second magnetic member 16 therein. Member 46 has a closed end 48 that receives fiberoptic connector 18. A protective cover 50 generally surrounds member 46 so as to protect the interior cavity 52 of member 46. Cover 50 helps to prevent contamination from entering cavity 52 and affecting the transmission of light therein.

First magnetic member 14 comprises an elongate member 54, a magnet 56, and a paddle 58. First magnetic member 14 is pivotally mounted about point 60 to body member 12. In accordance with the preferred embodiment, first magnetic member 14 is pivotally mounted to a sleeve 62 that is connected to and extends from lower part 34 of upper body portion 32. Pivot 60 allows the rotational movement of first magnetic member 14 thereabout. Magnet 56 is affixed to or contained within elongate member 54. In the preferred embodiment, elongate member 54 would be made of a non-magnetic material that would have an opening for receiving magnet 56. However, this is not meant to limit the present invention since many different types of attachment means could also secure a magnet 56 to the elongate member 54.

Elongate member 54 extends from pivot 60 downward and beyond end 64 of body member 12. A spring 66 extends from sleeve 62 downwardly to stop 68 about the outer surface of elongate member 54. Spring 66 causes the elongate member 54 to return to an original position.

A paddle 58 is affixed to the end 70 of elongate member 54. As can better be seen in FIG. 2, paddle 58 is circular in shape and can be attached to the end 70 of elongate member 54 by a spot-weld, a nut and bolt, or other suitable means. The only major requirement of paddle 58 is that it have a diameter sufficiently large to receive and act in response to the fluid flow.

Second magnetic member 16 comprises a magnet 72, a casing 74, an arm 76, and a reflective surface 78. Second magnetic member 16 is pivotally mounted to slotted member 46 about point 80. Second magnetic member 16 is pivotally mounted so as to allow the free rotation of the second magnetic member about pivot point 80. As illustrated in FIG. 1, second magnetic member 16 has a magnet 72 contained within cylindrical casing 74. It should be noted however, that this is just one method of affixing the magnet 72. Many other techniques could be employed within the spirit of the invention. Arm 76 extends outwardly from the surface of casing 74. Arm 76 has a reflective surface 78 affixed thereto (or developed thereon). Reflective surface 78 should be of a quality to reflect light from any optical fiber that may extend through connector 18.

Connector 18 is a male connector that allows the insertion of an optical fiber therein. As shown in FIG. 1, the connector will adopt the threads 82 and extend through the interior 84 of connector 18. In an assembled arrangement, the optical fiber will be received by and extend into opening 86. Thusly, the optical fiber will be in a position to receive light information as reflected by reflective surface 78 on second magnetic member 16.

In operation, the reflective surface 78 will move in relation to the existence or absence of fluid flow acting on paddle 58. FIG. 1 illustrates the direction of fluid flow. In this case, the fluid flow is causing the paddle 58 to be shifted to the left. Since magnets 56 and 72 have their north poles adjacent each other, these magnets act to repel each other. For the purposes of this invention, top 38 should be sufficiently thin so as to allow these repulsive forces to pass therethrough and act on each other. With flow acting on paddle 58, second magnetic member 16, along with its reflective surface 78, is in a position to fully reflect any light passing through an optical fiber within connector 18 to be reflected back into that optical fiber. In conjunction with the electronics to be described hereinafter, this will pass light so as to produce a signal indicating that flow is acting on paddle 58.

If there is no fluid acting on paddle 58, first magnetic member 14 will pivot about axis 60 and move to a position generally adjacent wall 88 of upper body portion 32. When magnet 56 moves toward wall 88, the repulsive magnetic force of magnet 58 will cause second magnetic member 16 to move toward wall 90 of slotted member 46. In the absence of such fluid flow, second magnetic member 16 will move so as to cause reflectiv surface 78 to be angled away from the light passing from an optical fiber within connector 18. In operation, this will mean that no light (or minimal amounts of light) will pass back into the optical fiber. As a result, the electronics of the present invention will produce a humanly perceivable indication that there is either no fluid flow acting on paddle 58 or that the optical path has been severed.

When flow once again acts on paddle 58, the first magnetic member 14 will return to its original position, as shown in FIG. 1, and second magnetic member 16 will reflect light into optical fiber 18. As before, this will produce an indication that flow is acting on paddle 58 and passing through the pipeline being monitored.

Referring to FIG. 3, there is shown at 100 the electronics of the fiberoptic flow monitoring system of the present invention. Specifically, the fiberoptic flow monitoring system 100 comprises light source 112, beamsplitter 114, fiberoptics 115, flow switch 116, detector 118, and output circuitry 120.

Light source 112 includes a light-emitting diode 130. Light-emitting diode 130 is a semiconductor device that produces a visible or invisible luminescence when a voltage is supplied to it. The voltage for light-emitting diode 130 is received from the LED oscillator driver 132. Oscillator driver 132 is powered by input voltage 134.

Light-emitting diode 130 is connected and coupled to beamsplitter 114. Beamsplitter 114 includes a housing which contains the beamsplitter and receives the light source, optical fiber, and detector components of the present invention. Specifically, beamsplitter 114 is an optical arrangement that reflects part of the beam of light and transmits part of that beam of light. The fiberoptics 115 are arranged such that the optical fiber receives the light as transmitted by LED 130. Photodetector 144 is also connected to beamsplitter 114. In the preferred embodiment of this invention, these components are arranged such that light will be tranmissive therebetween. In other words, light from LED 130 should pass through the beamsplitter and be received by fiberoptics 115. The light returning through fiberoptics 115 from switch 116 is reflected off beamsplitter 114 and is received by photodetector 144.

Fiberoptics 115 is a single optical path extending from beamsplitter 114 to switch 116. Optical fiber 115 is a type of transmission media that allows light to be transmitted long distances and around corners with little loss and without interference from other light sources. Optical fiber 115 is a very thin tube of quartz, glass, or plastic which is designed to transmit a beam of light from one end to the other by essentially reflecting it from side to side as it travels down the fiber. In accordance with the present invention, fiberoptics 115 comprises a single optical fiber pathway. One end of fiberoptics 115 is coupled to the beamsplitter 114 and arranged so as to receive light from LED 130. The light from LED 130 will travel along optical fiber 115 to its other end at switch 116. A connector coupling 150 is illustrated to show that the optical fibers may be joined end to end to form a single optical pathway. Many individual optical fibers may be joined, in end-to-end relationship, to form the single optical pathway. As a result, optical fiber 115 may have a length as long as several kilometers. This maximizes the distance between the electrical circuitry of the present invention and the potentially hazardous environment of flow switch 116.

Detector 118 is comprised of photodetector 144, light amplifier 190, voltage amplifier 192, rectifier 194, filter 196, and trigger circuit 197. Light amplifier 190 and voltage amplifier 192 are electrically connected to the photodetector 144 so as to improve the quality and increase the strength of the signal, produced by photodetector 144, to the level required for the output circuitry. Rectifier 194 converts the AC input into a DC output. Filter 196 is electrically connected to rectifier 194 and serves to remove the noise outputs of photodetector 144 from acting on output circuitry 120. Trigger circuit 197 is electrically connected to filter 196. This trigger circuit 97 produces an output of fixed amplitude and duration. This circuit sets the threshold level of voltage which determines when the flow switch is definitely on or off. It also eliminates many of the problems caused by minor variations in voltage.

The output circuitry of the present invention comprises relay and driver 200, LED 202, and TTL output 204. Relay and driver 200 produces a switching signal relative to the actions of flow switch 116. Relay and driver 200 can be used to connect with auxiliary equipment so as to activate this auxiliarly equipment in response to conditions acting on flow switch 116. LED 202 is similarly activated in response to the flow affecting switch 116. As seen in FIG. 3, the light-emitting diode 202 is activated when light is reflected from flow switch 116 to fiberoptics 115. Alternatively, the light-emitting diode is off when light is not reflected from switch 116. LED 202 serves as a visual indication of the light passing through fiberoptics 115 and serves as an indicator for link integrity. TTL output 204 is a transistor-transistor logic circuit. As used within the present invention, this TTL output 204 transmits the signal from the fiberoptic flow monitoring system 100 to a computer external of the system. This circuit allows the present invention to be integrated with computerized control and monitoring systems.

The operation of the present invention is described hereinafter. The switch 116 has a two-state operation. The first state is where the reflective surface 78 is generally adjacent the end of optical fiber 115. In this state, light source 112 passes light through beamsplitter 114 and into the end of optical fiber 115 about connector 150. Light travels along optical fiber 115 until it reaches its end within flow switch 116. Reflective surface 78 reflects the light back to the end of optical fiber 115. This light then passes back through optical fiber 115 and is emitted at the end adjacent connector 150. This light is then reflected off of beamsplitter 114 and is received by photodetector 144. A signal is created by the impingement of light upon photodetector 144. This signal passes through amplifiers 190 and 192, rectifier 194, filter 196, trigger circuit 197, and produces an output signal in relay 200, LED 202, and TTL output 204. In operation, LED 202 will be illuminated indicating that light is reflecting through optical fiber 115. Similarly, this signal causes the relay to remain in its normal state. The signal is also transmitted through TTL output 204 as input to a connected computer system.

The second state of the fiberoptic flow monitoring system 100 of the present invention occurs when light is not reflected in flow switch 116 back through optical fiber 115. As before, light is emitted by LED 130, passes through beamsplitter 114 and into one end of optical fiber 115. The light travels the path of optical fiber 115 and is emitted at its other end within flow switch 116. In this second state, second magnetic member 16, along with reflective surface 78, is moved to its other position through the interaction of magnets 56 and 72. This means that reflective surface 78 is moved away from the end of optical fiber 115 such that light is not reflected back into the optical fiber. Instead, light is reflected onto the walls of second cavity 52. Since no light passes back through optical fiber 115, no light is received by photodetector 144. As a result, no signal (or only a minimal signal) is created by photodetector 144. In this manner, the signal does not pass to output circuitry 120. The lack of a signal causes LED 202 to turn off. This action also causes relay 200 to deactivate, thereby causing switch 206 to change positions. In operation, the deactivating of LED 202 provides a visual indication of the absence of fluid flow affecting paddle 58 about first magnetic member 14 of flow switch 116. More generally, this signal indicates a "failure" condition in which either there is no flow in the pipe, the fiberoptics have been severed, or link integrity has been destroyed. Similarly, relay and driver 200 can be arranged so as to produce a resultant control-type action by the movement of switch 206. Also, the TTL output 204 will send the appropriate signal to the computer that the light is not reflecting from switch 116.

The present invention offers a number of advantages not found in the use of electrical flow indicators. First, and foremost, the use of fiberoptics and magnetic fields means that the flow switch is inherently safe and particularly useful in extremely hazardous, explosive-type environments. Secondly, the present invention offers a highly reliable alternative to the use of electricity for monitoring fluid flow. As long as link integrity is maintained of the fiberoptics, there should be none of the usual electrical circuitry problems affecting current monitoring systems in the work environment. Additionally, the present invention has a rather simple and easy to manufacture configuration which should be economically competitive with electrical flow monitoring systems.

This is but a single application of the present invention. The present invention could be widely used in other applicatios. Similarly, the flow switch of the present invention could be incorporated into areas that have strong electromagnetic interference or areas that are strongly susceptible to such interference. Since the flow switch is a totally passive device, and since no electricity passes through the optical fiber, the present invention is particularly useful in such applications. Furthermore, the single optical path design of the present invention eliminates the cost of multiple optical fiber arrangements and complex electronic devices.

The foregoing disclosure and description of the invention is illustrative and explanatory thereof, and various changes in the size, shape, and materials, as well as in the details of the illustrated construction, may be made within the scope of the appended claims without departing from the spirit of the invention. This invention should only be limited by the appended claims and their legal equivalents.

I claim:

1. A flow switch comprising:
   a body having at least one cavity occurring therein;
   a first magnetic means pivotally connected to said body and extending into said cavity, said first magnetic means having a portion extending beyond said body, said portion for encountering a fluid flow, said first magnetic means movable relative to the existence of absence of a fluid flow encountering said portion;
   a second magnetic means pivotally connected to said body, said first magnetic means and said second magnetic means being magnetically interactive within said cavity of said body such that a movement of said first magnetic means actuates a movement of said second magnetic means corresponding to the existence or absence of a fluid flow encountering said portion of said first magnetic means, said second magnetic means having a reflective surface fixedly positioned thereonto; and
   fiberoptic connector means coupled to said body for receiving at least one optical fiber, said fiberoptic connector means for positioning said optical fiber adjacent said reflective surface, said reflective surface for reflecting light toward or away from said optical fiber relative to the movement of said second magnetic means.

2. The flow switch of claim 1, said first magnetic means comprising:
   an elongate member pivotally connected to said body; and
   a magnet affixed to the end of said elongate member within said cavity.

3. The flow switch of claim 2, said first magnetic means further comprising:
   a paddle affixed to the end of said elongate member extending beyond said body, said paddle forming said portion of said first magnetic means.

4. The flow switch of claim 2, further comprising:
   orientation means arranged about said elongate member for maintaining said elongate member in a position relative to the existence of the flow of a fluid acting on said elongate member.

5. The flow switch of claim 4, said elongate member movable between a first and a second position, said first position corresponding to the existence of a flow of a fluid, the second position corresponding to the absence of a flow.

6. The flow switch of claim 4, said orientation means comprising:
   a spring affixed about the exterior surface of said elongate member, said spring causing said elongate member to return to an original position.

7. The flow switch of claim 1, further comprising flow connector means about one end of said body, said flow connector means enabling said first magnetic means to have said portion extend into the flow of a fluid.

8. The flow switch of claim 7, further comprising body rotation means incorporated about said body so as to permit adjustment of the position of said first magnetic means relative to the flow of a fluid.

9. The flow switch of claim 1, said second magnetic means pivotally mounted within a second cavity in said body, said second magnetic means including a magnet arranged relative to said first magnetic means such that the adjacent poles of said first magnetic means and said second magnetic means exert opposing magnetic forces upon each other so as to cause the actuation of movement of said second magnetic means corresponding to the existence or absence of a fluid flow encountering said portion of said first magnetic means.

10. The flow switch of claim 9, said second magnetic means movable between a first position and a second position within said second cavity, said first and second positions being in correspondence to the existence and absence, respectively, of fluid flow acting on said first magnetic means.

11. The flow switch of claim 10, said second magnetic means comprising:
a magnetic member;
a casing surrounding said magnetic member, said reflective surface extending from said casing so as to be generally adjacent said fiberoptic connector means.

12. The flow switch of claim 1, said fiberoptic connector means comprising a receptacle extending through said body into said cavity, said receptacle positioned so as to be generally adjacent said reflective surface of said second magnetic means.

13. A fiberoptic flow indicator comprising:
a light source means;
a flow indicator switch responsive to the existence of fluid flow, said flow indicator switch comprising:
  a body having at least one cavity formed therein:
  a first magnetic member pivotally connected to said body and extending into said cavity, said first magnetic member having a portion extending beyond said body, said portion for encountering a fluid flow:
  a second magnetic member pivotally connected to said body, said first magnetic member and said second magnetic member being magnetically interactive within said body such that a movement of said first magnetic member actuates a movement of said second magnetic member corresponding to the existence of a fluid flow, said second magnetic member having a reflective surface fixedly positioned thereonto; and
  a fiberoptic connector attached to said body;
fiberoptic means for transmitting light from said light source means to said flow indicator switch, said fiberoptic connector receiving said fiberoptic means such that the end of said fiberoptic means is adjacent said reflective surface of said second magnetic member, said reflective surface of said second magnetic member for causing said light from said light source means to be reflected toward or away from the end of said fiberoptic means relative to the existence of a fluid flow;
detector means arranged so as to receive light from said fiberoptic means, said detector means being responsive to said light from said fiberoptic means; and
output means electrically connected to said detector means for producing a signal relative to said light as received by said detector means.

14. The fiberoptic flow indicator of claim 13, said first magnetic member comprising:
an elongate member pivotally connected to said body;
a magnet affixed to the end of said elongate member within said cavity; and
a paddle affixed to the end of said elongate member extending beyond said body, said paddle adapted so as to be interactive with the flow of a fluid.

15. The fiberoptic flow indicator of claim 13, said light source means being a light-emitting diode, said fiberoptic means comprising a single optic fiber path, said second magnetic member being pivotally mounted within a second cavity in said body, said second magnetic member including a magnet arranged relative to the first magnetic member such that the adjacent poles of said first magnetic member and said second magnetic member exert opposing magnetic forces upon each other, said second magnetic member movable between a first position and a second position within said cavity, said reflective surface movable between a first and second location within said cavity, said first location being generally adjacent said fiberoptic means so as to reflect light from said fiberoptic means toward said fiberoptic means, said second location causing said light from said fiberoptic means to reflect away from said fiberoptic means.

16. The fiberoptic flow indicator of claim 13, said detector means comprising:
a photodetector positioned relative to said fiberoptic means so as to be electrically responsive to light emitted by said fiberoptic means;
an amplifier means electrically connected to said photodetector;
rectifier means electrically connected to said amplifier means;
filter means electrically connected to said rectifier means; and
trigger means electrically connected to said photodetector for producing an output of fixed amplitude.

17. The fiberoptic flow indicator of claim 13 further comprising beamsplitter means, said beamsplitter means for passing said light from said light source means to said fiberoptic means and passing said light from said fiberoptic means to said detector means.

18. The fiberoptic flow indicator of claim 13, said output means comprising a light-emitting diode having on/off capability responsive to the position of said reflective surface of said second magnetic member within said body of said flow indicator switch.

* * * * *